United States Patent
Piner

(10) Patent No.: US 9,752,787 B1
(45) Date of Patent: Sep. 5, 2017

(54) ENCASED DIRECT BURIED VALVE

(71) Applicant: RMF Engineering, Raleigh, NC (US)

(72) Inventor: Cheryl M. Piner, Raleigh, NC (US)

(73) Assignee: RMF ENGINEERING, INC., P.C., Baltimore, MD (US)

( * ) Notice: Subject to any disclaimer, the term of this patent is extended or adjusted under 35 U.S.C. 154(b) by 0 days.

(21) Appl. No.: 15/216,395

(22) Filed: Jul. 21, 2016

(51) Int. Cl.
| | | |
|---|---|---|
| *F17D 1/00* | (2006.01) | |
| *F24D 10/00* | (2006.01) | |
| *F17D 1/08* | (2006.01) | |
| *F16K 27/12* | (2006.01) | |
| *F16L 55/07* | (2006.01) | |
| *F16K 1/22* | (2006.01) | |
| *E03B 7/04* | (2006.01) | |
| *E03B 7/07* | (2006.01) | |

(52) U.S. Cl.
CPC ............... *F24D 10/00* (2013.01); *E03B 7/04* (2013.01); *E03B 7/07* (2013.01); *F16K 1/22* (2013.01); *F16K 27/12* (2013.01); *F16L 55/07* (2013.01); *F17D 1/084* (2013.01)

(58) Field of Classification Search
CPC ......... Y10T 137/6995; Y10T 137/7021; Y10T 137/7036; E03B 7/095; E03B 9/10; F16K 27/006; F24D 10/00
USPC ....... 137/363, 364, 365, 366, 367, 368, 369, 137/370, 371, 375, 599.11; 73/201; 52/20
See application file for complete search history.

(56) References Cited

U.S. PATENT DOCUMENTS

| | | | | |
|---|---|---|---|---|
| 204,010 | A * | 5/1878 | Donahoe | E03B 9/08 137/295 |
| 3,871,400 | A * | 3/1975 | Thastrup | F16K 27/006 137/363 |
| 4,013,087 | A * | 3/1977 | Hanna | E02L 1/002 137/110 |
| 4,809,548 | A * | 3/1989 | Rivero-Olmedo | G01F 15/18 251/904 |
| 8,474,476 | B2 * | 7/2013 | Ball | E03B 9/14 137/292 |
| 2003/0037818 | A1 * | 2/2003 | Helle | E03B 7/072 137/364 |
| 2008/0150750 | A1 * | 6/2008 | Parris | G01D 4/002 340/870.02 |
| 2012/0280163 | A1 * | 11/2012 | Lunder | E03F 7/02 251/326 |

* cited by examiner

*Primary Examiner* — Reinaldo Sanchez-Medina
(74) *Attorney, Agent, or Firm* — Hogan Lovells US LLP

(57) ABSTRACT

A system and method of providing a high temperature hot water system assembly including a direct buried valve box that connects to one or more underground service pipes is disclosed. The buried valve box contains a valve assembly configured to control the flow of water through the one or more service pipes. An air gap within the valve box allows for movement and expansion of the components as the temperatures rise, preventing cracking or other failures. A bypass valve is also provided within the buried valve box, allowing for a small amount of hot water to flow through the service pipes to gradually increase the temperature. The direct buried valve boxes, controllable through valve risers that terminate in surface assembly boxes, eliminate the need for large, concrete underground vaults that make maintenance and operation of valve assemblies more difficult.

16 Claims, 4 Drawing Sheets

ENCASED DIRECT BURIED VALVE

FIELD OF THE INVENTION

This invention pertains to valve assemblies for high-temperature hot water systems, and in particular to a pre-insulated and encased buried valve assembly operable using a surface valve access box.

BACKGROUND OF THE INVENTION

High-temperature hot water systems, which operate at temperatures typically exceeding 350° F. and pressures over 300 psi, are commonly used in large, hot water distribution systems. These systems may be, for example, district heating, which is a system used for distributing heat that is generated in a central location for residential, commercial, or government heating requirements. For example, university campuses, industrial manufacturing facilities, prisons, military or government bases or facilities, and may have district high-temperature hot water heating systems. As another example, they could be systems requiring high-temperature process applications including heat transmission for air and roller driers and washing equipment in kitchens, and sterilizers in hospitals or labs.

Currently, high-temperature hot water systems require the use of manholes, including large, underground concrete vaults that contain mechanical piping and valves exposed within the vault. To actuate these high-temperature valves, workers must remove the manhole covers and descend below ground into the vaults. However, workers are often reluctant to do so. These vaults are often confined spaces that are dark and hot, and require extra safety precautions and permits to enter and activate, close, adjust, and maintain the valves. These vaults can also be complex, with a plethora of different valves placed within the same area. This can make it difficult for workers to identify the high-temperature valve(s) that should be adjusted.

While buried valve assemblies have been used in some low-temperature water systems, these assemblies are not capable of handling high-temperature hot water. In particular, low-temperature buried valves cannot accommodate thermal expansion and do not allow drainage in the event ground water enters the system and comes in contact with the pipe, potentially causing flashing and system failure. They would therefore be incapable of use in a high temperature environment. Thus, what is needed is a direct buried valve, with surface access boxes to activate and control the valves, allow drainage, which can be used in high temperature water systems.

SUMMARY OF THE INVENTION

The present invention is directed to a system and method for a direct buried valve for a high-temperature hot water system. The direct buried valve is buried in the ground, instead of being placed within an underground vault. The valve assembly may be a pre-insulated and encased valve, such as a butt-welded ball valve. A watertight enclosure may encase the valve, and a bypass warm-up valve may also be included within the enclosure. The enclosure may contain a support for the valve including a steel plate, an outer steel casing, insulation, an air gap allowing for expansion of the outer casing and other steel components in the system, and a jacket. The jacket may be a fiber-reinforced polymer (FRP) jacket, or a high density polyethelyne (HDPE) jacket. A short segment of pipe extending from each side of the valve and a steel anchor plate can be provided as a part of the assembly to ease installation and ensure that the full assembly remains watertight. The anchor plate minimizes movement at the valve location. The system may then expand towards expansion loops or expansion joints elsewhere in the system. Steel guides are provided around the service pipe inside the outer casing assembly just outside of the valve box to allow for the service pipe to remain supported while providing directional guidance for it to thermally expand. A valve stem riser may be connected into the enclosure and extend to a surface valve access box located near surface grade. If a bypass valve is included, a bypass valve riser stem may also be connected to the enclosure and extend to the surface valve access box. Controls within the surface valve access box allow an operator to open, close, and adjust the buried valves near surface grade.

Although the enclosure for the buried valve is configured to be watertight, it is possible that seals or gaskets may fail, or that the outer jacket may become compromised. In such situations, it is possible that water could enter the enclosure. In order to avoid damage to the valves caused by water in the enclosure, a drain may be provided to allow the system to drain any water from the enclosure before it turns to steam, which could cause rapid deterioration or an explosion or otherwise damage the buried valves, risers, and piping. Alternatively, the outer casing can be installed in a manner to allow the system to drain from the valve box to the pipe's air space and out to a low point drain.

DETAILED DESCRIPTION OF THE INVENTION

The system and method are directed to a direct buried valve assembly for use in high-temperature hot water systems. The system includes a buried valve assembly, valve stem risers, and a surface valve access box.

Figure 1:
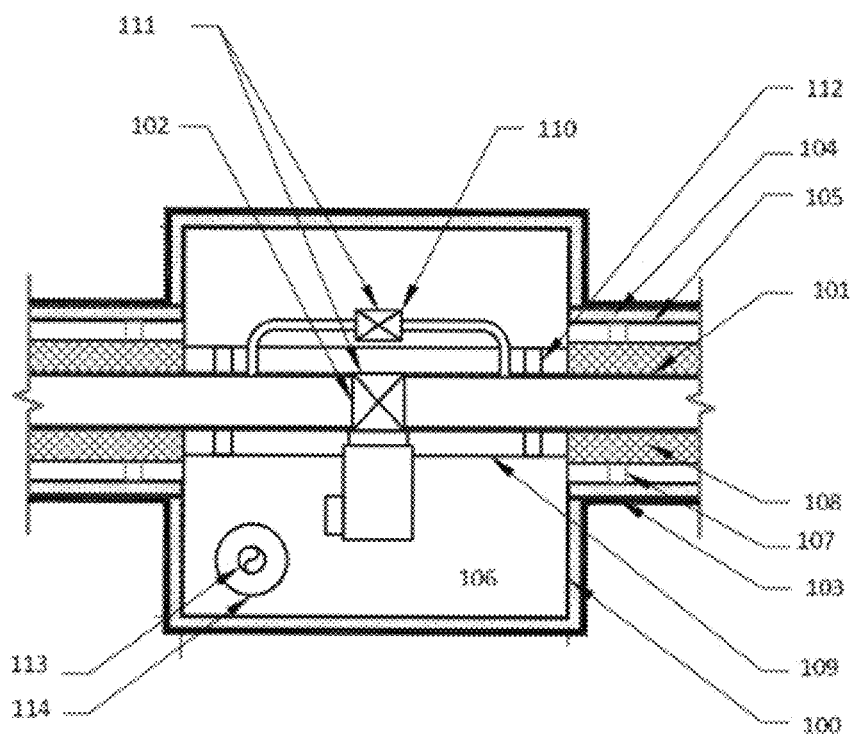
FIG. 1 is a top view of a buried valve box.

As shown in FIG. 1, which illustrates a top view, the buried valve assembly includes valve box 100, which is connected to one or more outer conduits 105. Service pipes 101 enter the interior of the buried valve box 100, where they join valve assembly 102. The services pipes 101 are used for distributing the high-temperature hot water from a district plant to buildings the system serves. The service pipe and valves are fully isolated from the outer casing/insulation/jacket, allowing the system to float inside the air space except at the anchor locations. Valves are provided prior to entering each building so that the system can be operated to allow for isolation of the system for maintenance. In the event the system needs to be worked on the valves can be closed to prevent high temperature hot water from entering the line being worked on but can remain operational to other areas connected to the system. Typically three valves are installed at each branch for both the supply and return piping.

The valve box 100 may be formed as a watertight container using an outer casing, such as steel, with insulation 104 and a watertight jacket 103, having an open interior area. The outer casing of the valve box 100 may join with or be integral with an outer conduit 105 surrounding connected service pipes 101. For example, a section of a service pipe may be included on either side of the valve box, as part of the overall assembly. This allows for easy connection to service pipes in the area of the buried valve box, while helping to ensure that the enclosure remains water tight by minimizing field joints. The outer conduit may be formed of steel, and may be at least 0.25 inches thick. The valve box may be encased in an outer insulation material 104, surrounded by an outer jacket material 103. The thickness of the outer jacket may vary, and the jacket may be formed from various materials. For example, the jacket 103 may be a 250 mm thick extrusion welded HDPE jacket, or a 125 mm thick FRP coating. Preferably, the outer insulation material 104 is positioned in the space between jacket 103 and the outer conduit 105.

As seen in FIG. 1, interior insulation 108 is provided adjacent to the service pipes 101, with an air gap 106 formed between the service pipes 101 and the outer conduit 105. A guide 107 may be included to help provide support while maintaining the separation of the pipe 101 from the outer conduit 105, ensuring that the air gap 106 remains open. The air gap allows for thermal expansion and movement of the service pipes 101, which often occurs in high temperature water systems and also allows for system draining in the event water enters the space.

The interior of valve box 100 is mostly open, again allowing for thermal expansion and movement of the components contained therein. Valve assembly 102 may be located in the center of the valve box 100. Valve assembly 102 is connected to pipes 101, allowing for adjustment of the water flow therein. When valve assembly 102 is closed, it stops the flow of water through the pipes. Valve assembly 102 may be opened to allow water to flow, and the extent to which the valve is opened may be adjusted to control the flow of water. Valve assembly 102 may be a class 600, triple-offset, butt-welded, high-performance butterfly valve. Other types and classes of valves may also be used, such as gate valves or class 300 valves. Prior to installation, the valves 102 may be hydrostatically and leak tested.

In addition to valve assembly 102, a bypass valve assembly 110, including a valve and lines connecting into service pipes 101, may be provided. The bypass valve assembly 110 allows for a small amount of water to flow through the pipes 101. This allows an operator to slowly warm up the system, so that it can expand at a reasonable rate, avoiding failure and cracking of the pipes, valves, or other components. Without a bypass valve 110, if valve assembly 102 was opened and a full amount of hot water allowed to run through the valves, pipes, and other components before they were sufficiently warmed, the valves, pipes, or other components could crack or burst. Implementation of the bypass valve 110 allows an operator to control the rate at which the temperature of the system increases, thereby avoiding sudden increases that could stress or crack system piping or other components.

In addition, a valve insulation material 111 may be provided around the valve assembly 102 and bypass valve assembly 110, including the bypass valve and bypass lines. This valve insulation material may be, for example, a silica aerogel, cellular foam glass, mineral wool, calcium silicate, or other insulating materials. A support plate 109 and service pipe saddle supports 112 may also be included in the interior of the valve box 100. These supports help to support the weight of the service pipes 101 and valves 102, 110 within the open interior of valve box 100, and further serve to maintain the proper positioning of the pipes and other system components. A drain pipe 113 extends from a flange 114, which may be welded to the outer conduit 105 of the valve box. The drain pipe allows for any water that may build up in, or leak into, the valve box to drain away before it can change to steam under the high temperature conditions and cause damage. Without such a drain pipe, any water present in the interior of the valve box may become heated and turn to steam, potentially causing an explosion of the valve box or damage to the pipes, valves, or other components in the box. Alternatively, the outer steel conduit 105 can be oversized near the valve box 100 and positioned so the bottom of each align allowing for the system to drain thru the outer steel conduit 105 to a low point drain assembly in the system. A check valve may be installed with the drain pipe, preventing water entering the valve box through the drain pipe. The drain pipe may be installed to a standard storm or sanitary sewer drainage structure and discharged into the storm or sanitary sewer system.

Figure 2:
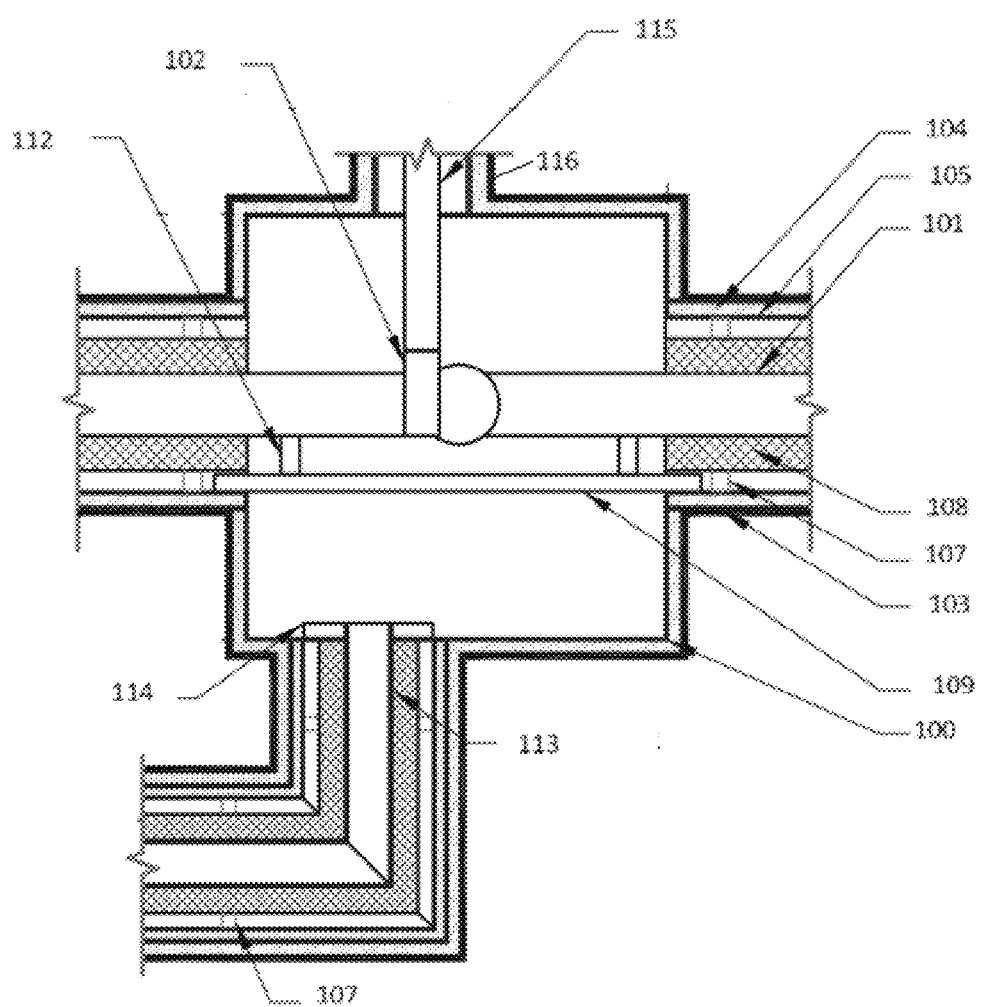
FIG. 2 is a side view of a buried valve box.

FIG. 2 illustrates the direct buried valve box from a side view perspective. As can be seen, the drain pipe 113 extends from the bottom of the valve box 100, allowing water exit the valve box. The drain pipe 113 may drain into a drain vault located at a predetermined distance from the valve box 100. Alternatively, the drain pipe 113 may drain into a larger drain pipe, another piping system, or directly into the surrounding earth. The valve box also contains a valve stem riser 115 and riser conduit 116, extending from valve box 100 to surface grade. The valve stem riser 115 may be encased within an insulated riser conduit 116. The valve stem riser 115 and riser conduit 116 may be formed similar to the piping 101. For example, the valve stem riser 115 may be provided within a casing, with air or insulation material filling the space between the riser 115 and casing. In addition, another layer of insulation may surround the outside of the casing, and this insulation may be covered by an outer jacket. The valve stem riser allows for control of the valve from the surface, rather than requiring a manhole and complex, underground vault that an operator must enter. The riser conduit 116 is a steel conduit that is attached to the valve box, for example by welding. Insulation and jacket similar to the valve box can be provided. The riser conduit houses the valve stem/shaft. The valve stem extends from the valve gear operator towards the valve box assembly above. A tee wrench that has a socket fitting the valve operating nut may be provided by the valve manufacturer. Operators can remove a flange located below the access cover 303 and use the wrench to open and close the valve.

In the system, the outer insulation keeps the internal temperature contained to prevent grass, trees, or other landscaping above the buried valve assembly from being affected by the heat of the high temperature hot water. The insulation thickness and materials may be selected based on the depth of the valve box, and the amount of heat within the system. The insulation thickness may be further selected so that the air gap between the insulation and the outer conduit does not cool to a temperature where condensation may occur. The outer jacket of the system is desired to keep the entire assembly watertight and prevent water intrusion into the system. Similarly, the insulation materials provided within the interior of the outer conduit are designed to maintain a high enough temperature that condensation does not occur, while keeping the system cool enough that the outer conduit or jacket would be stressed or rupture. The ideal air gap temperature is between 180° F. and 212° F.

Figure 3:
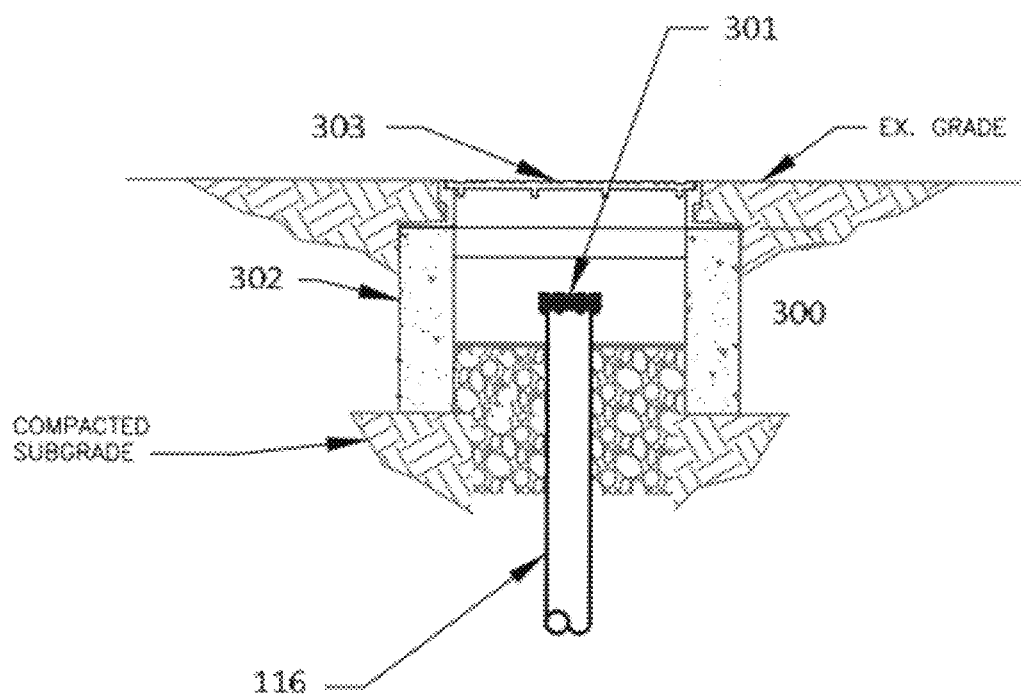
FIG. 3 is a view of a valve stem riser and surface access box.

FIG. 3 provides an illustration of the valve stem riser conduit 116 close to the surface. As shown, the riser conduit 116 containing the valve stem riser may be brought close to the surface, where it terminates within an enclosed space under a removable cover 303, such as an easily-removable cover similar to a manhole cover. For example, the valve stem riser may be brought to around 18 inches from the surface and sealed with a bolted flange, where it terminates in surface valve access box 300 under the removable cover. The valve access box 300 may be a precast concrete ring with a gravel base that protects the riser from water intrusion while maintaining access. The top of the valve stem riser may include a control 301, allowing an operator to open, close, or adjust valve 102 located in the buried valve box 100 by using a tee wrench fitted with a socket fitting the valve operating nut. The enclosed space may be formed using a concrete collar 302 which surrounds the top of the valve stem riser 115 and riser conduit 116. When a bypass valve assembly is included in the valve box, a bypass valve stem riser and shaft may also be included.

Figure 4:
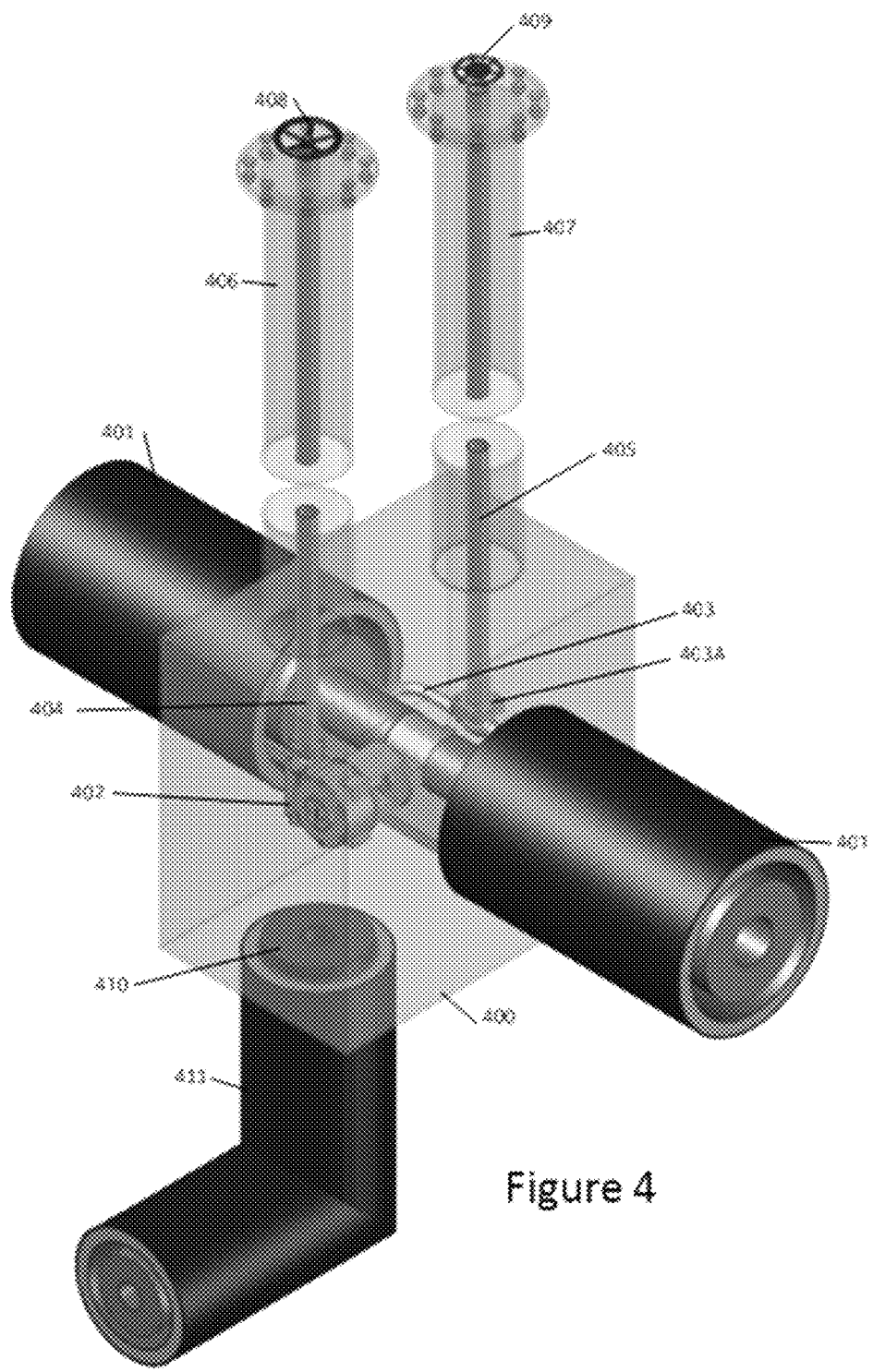
FIG. 4 is an illustration of the buried valve box, water pipes, and stem risers.

FIG. 4 provides an illustration of a high-temperature hot water buried valve system. The buried valve box 400 is connected to outer conduit pipes 401, and has a drain pipe 411 extending from a flange 410 in the bottom of the valve box 400. Main valve 402 and bypass valve assembly, including bypass valve 403A and bypass lines 403B, are included within the interior of the buried valve box 400. A valve stem riser 404 extends from main valve 402 toward the surface, terminating at a valve control 408. Valve stem riser 404 is contained within shaft 406. Similarly, the system includes a bypass valve stem riser 405 contained within shaft 407 and terminating at bypass valve control 409. Valve stem riser 404 and bypass valve stem riser 405 may terminate in one or more surface valve access boxes. An operator may open the surface valve access box, and use removable controls 408 and 409 to adjust main valve 402 or bypass valve 403A. To open, close, or adjust the main valve, an operator would access the surface valve access box, and use control 408 to open or close valve 402 a desired amount.

As mentioned, if the system has not been in use, such that the components and piping have cooled, it may be beneficial to first control the bypass valve 403A and allow the system to slowly warm. To do this, an operator may access the surface valve access box, and adjust the control 409. By adjusting the control, the operator can open the bypass valve 403A at a desired rate, thus allowing a controlled amount of high temperature hot water to flow through bypass lines 403B within the valve box 400 and into the service pipes 401. By allowing the controlled amount of water to flow through bypass lines 403B, the operator can slowly raise the temperature of the high temperature hot water buried valve system. This allows the system components to expand at a reasonable rate, avoiding cracking or failure that could occur if sudden temperature changes were introduced by first opening the main valve and allowing the full amount of hot water to flow through the system. As also mentioned, the various air gaps provided within the system, as well as the positioning of the insulation materials, allow the pipes, valves, and other components to expand and contract within the system. This allowance for movement enables the system to handle the high temperature hot water without cracking or failure.

Providing drain pipe 411 provides an additional prevention against failures in the system. By providing the drain, any condensation that builds up in the system and any external water that makes its way into the system can be safely removed before becoming heated to steam. If no drain were provided, water that either leaked into the system through a compromised area, or condensation that significantly built up within the system, could turn to steam and cause greatly increased pressures. These increased pressures may be too extensive for the system components to handle, and pipes, valves, or other components could crack, rupture, or explode.

In addition to being used in an underground, buried valve assembly, the system described above may also be implemented in an above ground system where double containment is preferred. Above ground double containment may be preferred in locations that have above ground high temperature piping that is near occupied spaces such as near buildings on military bases or in prison yards. If a system can become compromised due to impact, having double containment around the pipe makes it more difficult for the system to be damaged. Similarly, if there was a rupture on the service pipe, the outer casing could contain the steam that would be released from said rupture. The steam would then be released at a controlled air release point installed in the system.

The invention claimed is:

1. A high-temperature hot water system assembly comprising: a buried valve box having an outer casing; at least one outer conduit connected to the outer casing of the valve box, the at least one outer conduit surrounding one or more service pipes; at least one buried valve assembly contained inside the outer casing of the valve box and connected to the one or more service pipes, the at least one buried valve assembly configured to control the flow of water in the one or more service pipes; at least one bypass valve contained within the outer casing of the valve box configured to control the flow of water to bypass the valve assembly; an air gap formed within the buried valve box and surrounding the at least one buried valve assembly and the at least one bypass valve, the air gap further extending into an open space between the one or more service pipes and the at least one outer conduit; insulation material at least partially surrounding the outer casing of the valve box and the at least one outer conduit; and a drain, including a flange and drain pipe, positioned in the valve box.

2. The high-temperature hot water system assembly of claim 1, wherein the at least one bypass valve is configured to allow a small amount of water to flow through the one or more service pipes.

3. The high-temperature hot water system assembly of claim 1, further including at least one guide element positioned to maintain separation between the one or more service pipes and the at least one outer conduit, establishing the air gap.

4. The high-temperature hot water system assembly of claim 1, wherein the at least one valve assembly is a butterfly valve assembly.

5. The high-temperature hot water system assembly of claim 1, further comprising an outer jacket surrounding the buried valve box.

6. The high-temperature hot water system assembly of claim 1, wherein the drain further includes a check valve.

7. The high-temperature hot water system assembly of claim 1, further comprising a valve stem riser contained with a riser conduit, the valve stem riser extending from the buried valve box to the surface.

8. The high-temperature hot water system assembly of claim 7, wherein the valve stem riser terminates in a surface valve access box having a removable cover.

9. The high-temperature hot water system assembly of claim 7, further comprising a bypass valve stem riser extending from the buried valve box to the surface.

10. A method of installing a high-temperature hot water system assembly comprising: installing a buried valve box having an outer casing; the buried valve box containing: at least one buried valve assembly configured to control the flow of water in one or more service pipes; at least one bypass valve configured to control the flow of water to bypass the valve assembly; and an air gap formed within the buried valve box and surrounding the at least one buried valve assembly and the at least one bypass valve; connecting at least one outer conduit to the outer casing of the valve box, the at least one outer conduit surrounding the one or more service pipes; providing the air gap further extending into an open space between the one or more service pipes and the at least one outer conduit; providing an insulation material at least partially surrounding the outer casing of the valve box and the at least one outer conduit; and installing a drain, including a flange and drain pipe, in the valve box.

11. The method of installing a high-temperature hot water system assembly of claim 10, wherein the at least one bypass valve is configured to allow a small amount of water to flow through the one or more service pipes.

12. The method of installing a high-temperature hot water system assembly of claim 10, further comprising including at least one guide element positioned to maintain separation between the one or more service pipes and the at least one outer conduit, establishing the air gap.

13. The method of installing a high-temperature hot water system assembly of claim 10, further comprising surrounding the buried valve box with an outer jacket.

14. The method of installing a high-temperature hot water system assembly of claim 10, further comprising installing a valve stem riser contained with a riser conduit, the valve stem riser extending from the buried valve box to the surface.

15. The method of installing a high-temperature hot water system assembly of claim 14, wherein the valve stem riser terminates in a surface valve access box having a removable cover.

16. The method of installing a high-temperature hot water system assembly of claim 14, further comprising installing a bypass valve stem riser extending from the buried valve box to the surface.

\* \* \* \* \*